(12) United States Patent
Bricko

(10) Patent No.: US 9,968,079 B2
(45) Date of Patent: May 15, 2018

(54) COLLAPSIBLE-ADJUSTABLE ROD HOLDER

(71) Applicant: Joseph Thomas Bricko, Farmington, MN (US)

(72) Inventor: Joseph Thomas Bricko, Farmington, MN (US)

(*) Notice: Subject to any disclaimer, the term of this patent is extended or adjusted under 35 U.S.C. 154(b) by 0 days. days.

(21) Appl. No.: 14/985,950

(22) Filed: Dec. 31, 2015

(65) Prior Publication Data

US 2016/0183509 A1 Jun. 30, 2016

Related U.S. Application Data

(60) Provisional application No. 62/098,520, filed on Dec. 31, 2014.

(51) Int. Cl.
  *A01K 97/10* (2006.01)
  *A01K 97/12* (2006.01)
  *A01K 97/11* (2006.01)

(52) U.S. Cl.
  CPC ............. *A01K 97/10* (2013.01); *A01K 97/11* (2013.01); *A01K 97/12* (2013.01)

(58) Field of Classification Search
  CPC ......... A01K 97/10; A01K 97/11; A01K 97/12
  USPC .......... 248/514, 515, 518, 528, 533; 43/21.2
  See application file for complete search history.

(56) References Cited

U.S. PATENT DOCUMENTS

| 1,619,152 A * | 3/1927 | Nunlist | A01K 97/10 224/922 |
|---|---|---|---|
| 1,891,163 A * | 12/1932 | Kabele | A01K 97/10 248/518 |
| 2,530,265 A * | 11/1950 | Phalen | A01K 97/10 224/922 |
| 2,543,569 A * | 2/1951 | Dusatko | A01K 97/10 248/517 |
| 2,606,731 A * | 8/1952 | Harris | A01K 97/10 211/70.8 |
| 2,617,616 A * | 11/1952 | Lavender | A01K 97/10 248/515 |
| 2,683,008 A * | 7/1954 | Roederer | A01K 97/10 248/166 |
| 2,973,929 A * | 3/1961 | Zawadzki | A01K 97/10 248/513 |
| 3,327,978 A * | 6/1967 | Gates | A01K 97/10 248/175 |
| 3,562,947 A * | 2/1971 | Martin | A01K 97/11 43/15 |
| 3,636,649 A * | 1/1972 | Paiva | A01K 97/10 248/530 |
| 4,014,128 A * | 3/1977 | Hrdlicka | A01K 97/10 248/528 |
| 4,095,364 A * | 6/1978 | Prine | A01K 97/10 248/535 |
| 4,594,805 A * | 6/1986 | McClelland | A01K 97/10 248/520 |

(Continued)

*Primary Examiner* — Kimberly T Wood

(74) *Attorney, Agent, or Firm* — Gutwein Law; Greg N. Geiser

(57) ABSTRACT

A collapsible-adjustable rod holder. The collapsible-adjustable rod holder primarily designed to support a rod for ice fishing. The rod holder comprised of a pair end sections in hinged communication with a middle section wherein the sections are articulated and movable in hinged fashion. The end sections include an indent, the indent sized for the cradling receipt of a fishing rod and rod handle.

4 Claims, 3 Drawing Sheets

(56) References Cited

U.S. PATENT DOCUMENTS

| | | | | |
|---|---|---|---|---|
| 4,694,603 | A * | 9/1987 | Anderson | A01K 97/10 43/21.2 |
| 5,025,584 | A * | 6/1991 | Butterwick, Sr. | A01K 97/10 248/528 |
| 5,269,088 | A * | 12/1993 | Slaback, Jr. | A01K 97/12 43/17 |
| 5,345,708 | A * | 9/1994 | Loyd | A01K 97/10 43/15 |
| 5,855,087 | A * | 1/1999 | Risinger | A01K 97/10 248/514 |
| 6,196,513 | B1 * | 3/2001 | Edwards | A01K 97/10 248/520 |
| 6,427,376 | B1 * | 8/2002 | Weber | A01K 97/01 248/538 |
| 6,691,973 | B1 * | 2/2004 | Barfield | A01K 97/10 248/156 |
| 2004/0118031 | A1 * | 6/2004 | Nielson | A01K 97/01 43/21.2 |
| 2005/0102881 | A1 * | 5/2005 | Legendziewicz | A01K 97/10 43/21.2 |
| 2009/0241406 | A1 * | 10/2009 | Foss | A01K 97/11 43/21.2 |
| 2010/0299988 | A1 * | 12/2010 | Robinson | A01K 97/10 43/21.2 |

\* cited by examiner

COLLAPSIBLE-ADJUSTABLE ROD HOLDER

CROSS REFERENCE TO RELATED APPLICATIONS

This application claims priority to U.S. Provisional Patent Application No. 62/098,520 filed 31 Dec. 2014 to the above named inventor, and is herein incorporated by reference in its entirety.

FEDERALLY SPONSORED RESEARCH OR DEVELOPMENT

Not Applicable

SEQUENCE LISTING, A TABLE, OR A COMPUTER PROGRAM

Not Applicable

FIELD OF THE INVENTION

The present invention relates to an improved rod holder for primarily designed for use with an ice fishing rod.

BACKGROUND OF THE INVENTION

When fishing in the winter in northern climates individuals are often required to drill a hole into the ice surface to provide access to the water and potential fish located below the surface of the ice. Often, this type of fishing is done in very cold weather and at temperatures well below freezing. Often over the course of a fishing expedition an individual will drill multiple holes for fishing within. Due to extreme temperatures and the use of multiple holes, it is advantageous to utilize devices that allow for fishing from in an unattended line.

To fish a line that is not immediately attended by a user, fishermen often use a specialized device such as a tip-up or rod holder. Although tip-ups work for their intended purpose, they are specific for their purpose and do not allow a user to use a standard rod and reel. Rod holders allow a user to utilize an existing rod and reel, but are lacking in portability and adjustability.

Therefore, there is a need for an improved rod holder that is easily transported, adjustable for a large range of rods and positions and has the ability to be attached or affixed to additional fishing devices such as a heated box for use in ice fishing.

SUMMARY OF THE INVENTION

The device of the present invention relates to a collapsible and adjustable fishing rod holder. The device is designed to hold and cradle a fishing pole in a desired position above a fishing hole. The device includes a pair of opposed ends having a cradle connected via a hinged and articulating middle section. The hinged connections allow the device to folded and adjusted to different positions for placement of the fishing rod.

In an additional embodiment of the present invention, the device is connected to an illuminated-heated ice fishing box. The device is placed within a hinge of the illuminated ice fishing box with an end section and middle section acting as a hinge pin of the illuminated ice fishing box.

BRIEF DESCRIPTION OF THE SEVERAL VIEWS OF THE DRAWING(S)

The accompanying drawings are included to provide a further understanding of the present invention and are incorporated in and constitute a part of this specification. The drawings illustrate exemplary embodiments of the present invention and together with the description serve to further explain the principles of the invention. Other aspects of the invention and the advantages of the invention will be better appreciated as they become better understood by reference to the Detailed Description when considered in conjunction with accompanying drawings, and wherein.

DETAILED DESCRIPTION OF THE INVENTION

Figure 1:
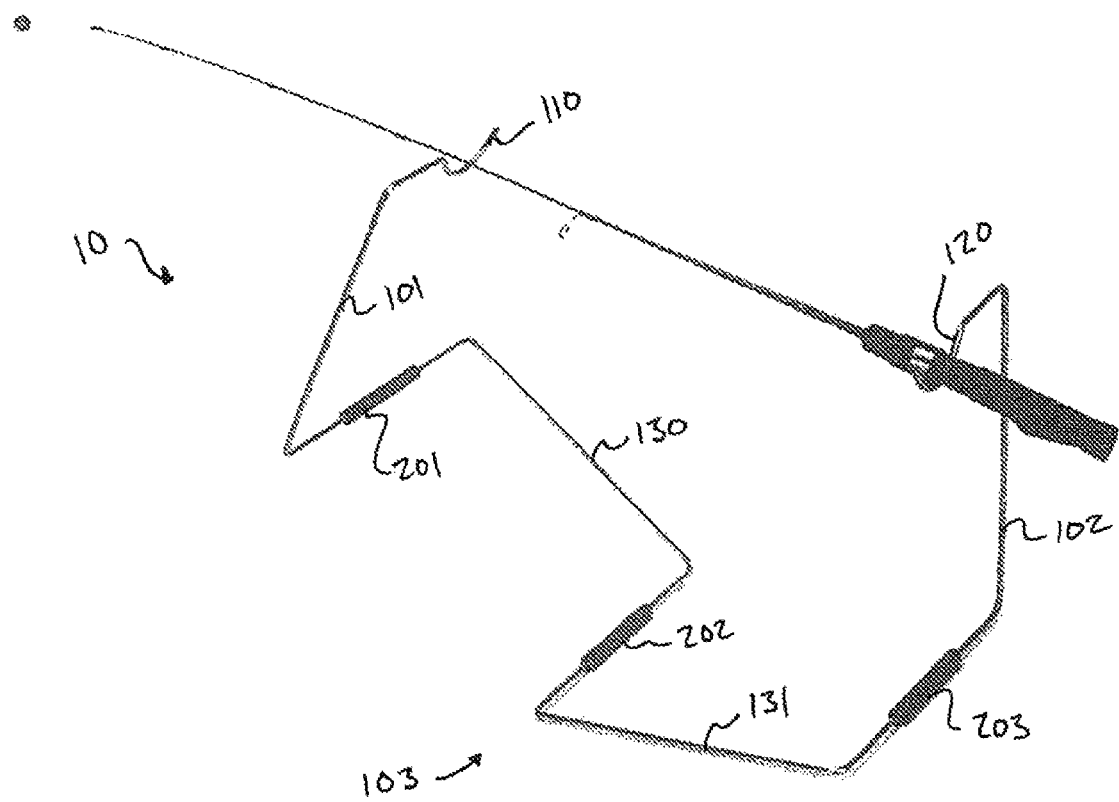
FIG. 1 is an isometric view of the collapsible-adjustable rod holder, according to the present invention.

The following detailed description includes references to the accompanying drawing, which forms a part of the detailed description. The drawing shows, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, the terms "front," "back," "rear," "upper," "lower," "right," and "left" in this description are merely used to identify the various elements as they are oriented in the FIGS, with "front," "back," and "rear" being relative to the apparatus. These terms are not meant to limit the elements that they describe, as the various elements may be oriented differently in various applications.

As used herein, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Referring now to FIG. 1-FIG. 4, the collapsible-adjustable rod holder assembly is shown and generally referred to as device 10. The rod holder assembly device 10 is comprised of a pair of opposed ends, a first end 101 and a second end 102 in hinged communication with a middle section 103. The first end 101 and the second end 102 include an indent 110 and 120. The indent 110 and 120 sized for receipt of the handle and rod of a fishing pole in a cradling fashion. In the preferred embodiment of the present invention, the middle section 103 is comprised of a pair of sections 130, 131 with each section in hinged communication with the other section. Preferably, the device 10 is constructed out of a wire form material and comprised of four separate sections; the first end 101 and the second end 102, a pair of middle sections 130 and 131, and three sleeves 201, 202, and 203 sized for receipt of the ends of the various sections (101, 102, 130, 131) wherein the sleeves 201-203 allow for hinged rotation of the various sections (101, 102, 130, 131) at the union of the sections within the sleeves 201-203. In this preferred embodiment, the middle sections 130 and 131 are identically sized U-shaped wire form sections hinged with a sleeve 202 at an end and wherein the middle sections 130 and 131 form an S-shape.

Figure 2:
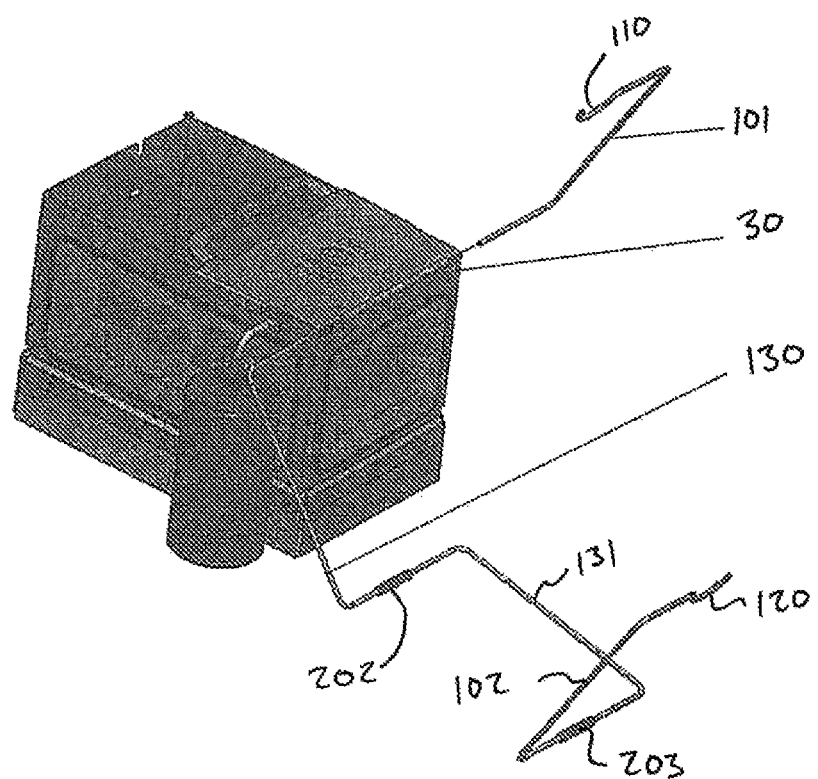
FIG. 2 is an isometric view of the collapsible-adjustable rod holder assembly attached to an ice fishing heated box, according to the present invention.
Figure 3:
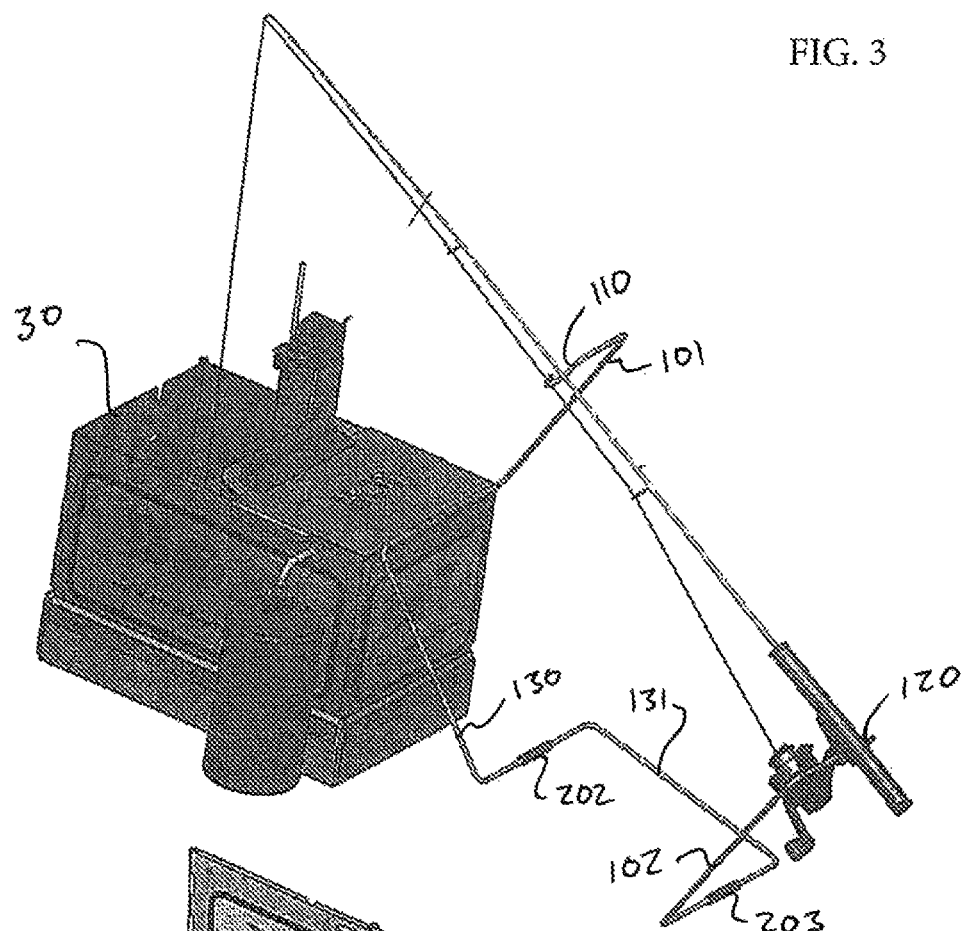
FIG. 3 is an isometric view of the collapsible-adjustable rod holder assembly attached to an ice fishing heated box with a rod in the holder, according to the present invention.
Figure 4:
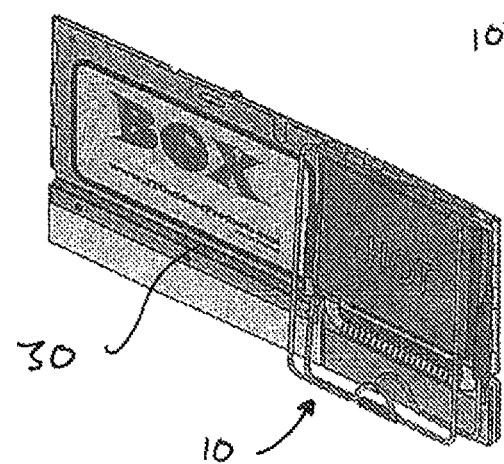
FIG. 4 is an isometric view of the collapsible-adjustable rod holder assembly attached to an ice fishing heated box in a folded configuration, according to the present invention.

In an alternate embodiment of the present invention (FIG. 2-4), the device 10 may be affixed to a hinge on a side of an ice fishing hotbox 30 extending outward and opposite the direction of the box 30. In this alternate embodiment, the first section 101 and a middle section 130 are placed within a hinge coil of the ice fishing box 30 at a side of the box 30. The middle section 130 is affixed in hinged communication via the sleeve 202 with the middle section 131. The middle section 131 is affixed in hinged communication via the sleeve 203 to the second end 102 and wherein the device is articulable and foldable against a side of the box 30. As is seen in FIG. 2-3, the rod holder 10 first end 101 extends upward from the top of the box 30, the middle section 130 extending downward and outward from the box 30 at an angle culminating at the surface of the ice and within the sleeve 202, the holder 10 middle section 131 end received within the sleeve 202 then extending perpendicular to the length of the box 10 and forming a U-shaped support structure for resting on the ice surface with an end in the sleeve 203 along with an end of the second end 102 with the second end 102 extending upward and angular away from the direction of the box 30 forming a rod handle holding section.

The holder 10 is collapsible and adjustable through the inclusion of hinged sections 201-203 at union points of the various rod holder sections previously described. These hinged unions 201-203 allow a user to easily fold the rod holding sections along themselves and against the hotbox structure when it is folded. This holder 10 is preferably designed to accommodate rods from between 24 inches to 48 inches long.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) but that the invention will include all embodiments falling with the scope of the specification.

What is claimed is:

1. A rod holding device, the rod holding device comprising:
   a first end section, the first end section having an indent, the indent sized for the receipt of a fishing rod and rod handle;
   a second end section, the second end section having an indent, the indent sized for the receipt of the fishing rod and rod handle;
   a first middle section, the first middle section being U-shaped and having a first leg, a second leg opposed to the first leg, and a center portion intermediate and connecting the first leg and the second leg, the first end section in a first hinged communication with the first leg of the U-shaped first middle section; and
   a second middle section, the second middle section being U-shaped and having a second first leg, a second second leg opposed to the second first leg, and a second center portion intermediate and connecting the second first leg and the second second leg, the second first leg in a second hinged communication with the second leg of the first middle section and the second second leg in a third hinged communication with the second end section, wherein the U-shape of the first middle section and the U-shape of the second middle section are positioned with an open portion of the first middle section and an open portion of the second middle section in an opposed position.

2. A device as in claim 1, wherein the first and second communications are sleeves.

3. A rod holding device, the rod holding device in communication with a box for ice fishing, the rod holding device comprising:
   a first end section, the first end section having an indent, the indent sized for the receipt of a fishing rod and rod handle;
   a second end section, the second end section having an indent, the indent sized for the receipt of the fishing rod and rod handle,
   a first middle section, the first middle section being U-shaped and having a first leg and a second leg opposed to the first leg and a center portion intermediate and connecting the first leg and the second leg, the first end section in a first hinged communication with the first leg of the U-shaped first middle section and within a hinge on the box for ice fishing; and
   a second middle section, the second middle section being U-shaped and having a second first leg and a second second leg opposed to the second first leg and a second center portion intermediate and connecting the second first leg and the second second leg, the second first leg in a second hinged communication with the second leg of the first middle section and the second second leg in a third hinged communication with the second end section, wherein the U-shape of the first middle section and the U-shape of the second middle section are positioned with an open portion of the U-shape of the first middle section in an opposed position relative to an open portion of the U-shape of the second middle section.

4. A device as in claim 3, wherein the first middle section, second middle section, and second end section are each in hinged communication with a sleeve.

\* \* \* \* \*